(12) United States Patent
Deeman et al.

(10) Patent No.: US 7,218,466 B1
(45) Date of Patent: May 15, 2007

(54) CONTACT PRINTING OF MAGNETIC MEDIA WITH MECHANICALLY REINFORCED AND/OR GAS VENTING STAMPER

(75) Inventors: Neil Deeman, Fremont, CA (US); Joseph Leigh, Campbell, CA (US); Koichi Wago, Sunnyvale, CA (US); Li-Ping Wang, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 661 days.

(21) Appl. No.: 10/453,565

(22) Filed: Jun. 4, 2003

Related U.S. Application Data (60) Provisional application No. 60/392,829, filed on Jun. 28, 2002.

(51) Int. Cl.
*G11B 5/86* (2006.01)
(52) U.S. Cl. ...................................................... 360/17
(58) Field of Classification Search .................... None
See application file for complete search history.

(56) References Cited

U.S. PATENT DOCUMENTS

| | | | |
|---|---|---|---|
| 5,991,104 A | | 11/1999 | Bonyhard |
| 6,714,367 B1 * | | 3/2004 | Ishida et al. ................. 360/17 |
| 6,798,590 B2 * | | 9/2004 | Albrecht et al. ............. 360/16 |
| 2002/0051307 A1 * | | 5/2002 | Nishikawa et al. .......... 360/17 |

OTHER PUBLICATIONS

Kuo et al., Patterning of Magnetic Media via Contact Printing with High Saturation Magnetization, High Permeability Stamper, U.S. Appl. No. 10/082,178, filed Feb. 26, 2002.

* cited by examiner

*Primary Examiner*—William Korzuch
*Assistant Examiner*—Daniel L. Negrón
(74) *Attorney, Agent, or Firm*—McDermott Will & Emery LLP (57) ABSTRACT

An apparatus for performing contact printing of a magnetic transition pattern in a magnetic recording medium, comprising:
(a) a stamper/imprinter including a body formed of at least one magnetic material having a high saturation magnetization $B_{sat}$ and a high permeability, including an imprinting surface adapted to be placed in intimate contact with a surface of a magnetic layer, the imprinting surface comprised of a plurality of patterned areas which separate a plurality of areas which are not patterned, each of the areas which is not patterned being provided with at least one of:
(i) mechanical reinforcing means for preventing deformation of the body when the imprinting surface is urged into contact with the surface of the magnetic layer; and
(ii) gas venting means for facilitating removal of air or other gas from between the imprinting surface and the surface of the magnetic layer when the former is urged into contact with the latter.

12 Claims, 6 Drawing Sheets

CONTACT PRINTING OF MAGNETIC MEDIA WITH MECHANICALLY REINFORCED AND/OR GAS VENTING STAMPER

CROSS-REFERENCE TO PROVISIONAL APPLICATION

This application claims priority from U.S. provisional patent application Ser. No. 60/392,829 filed Jun. 28, 2002, the entire disclosure of which is incorporated herein by reference.

FIELD OF THE INVENTION

The present invention relates to methods and devices for forming magnetic transition patterns in a layer or body of magnetic material. The invention has particular utility in the formation of servo patterns in the surfaces of magnetic recording layers of magnetic data/information storage and retrieval media, e.g., hard disks.

BACKGROUND OF THE INVENTION

Magnetic recording media are widely used in various applications, e.g., in hard disk form, particularly in the computer industry for storage and retrieval of large amounts of data/information in magnetizable form. Such media are conventionally fabricated in thin film form and are generally classified as "longitudinal" or "perpendicular", depending upon the orientation (i.e., parallel or perpendicular) of the magnetic domains of the grains of the magnetic material constituting the active magnetic recording layer, relative to the surface of the layer.

Figure 1:
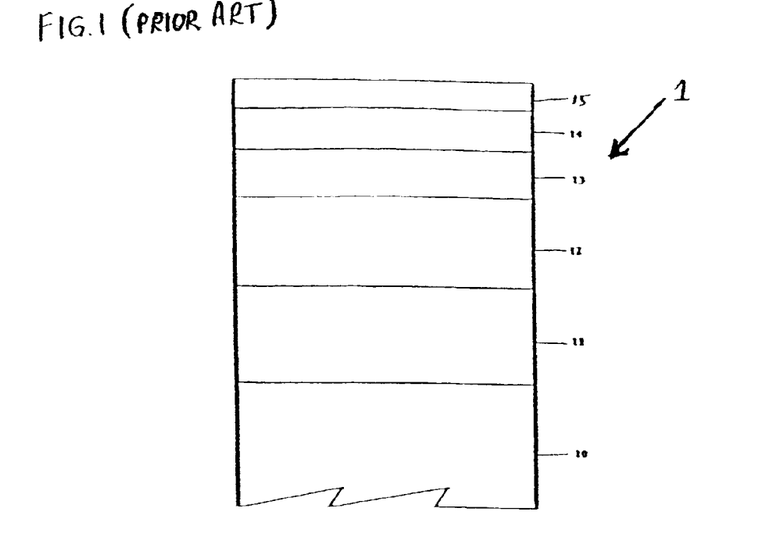
FIG. 1 illustrates, in schematic, simplified cross-sectional view, a portion of a longitudinal-type thin film magnetic recording medium.

A portion of a conventional thin-film, longitudinal-type recording medium 1 utilized in disk form in computer-related applications is schematically depicted in FIG. 1 and comprises a non-magnetic substrate 10, typically of metal, e.g., an aluminum-magnesium (Al—Mg) alloy, having sequentially deposited thereon a plating layer 11, such as of amorphous nickel-phosphorus (NiP), a polycrystalline underlayer 12, typically of chromium (Cr) or a Cr-based alloy, a magnetic layer 13, e.g., of a cobalt (Co)-based alloy, a protective overcoat layer 14, typically containing carbon (C), e.g., diamond-like carbon ("DLC"), and a lubricant topcoat layer 15, typically of a perfluoropolyether compound applied by dipping, spraying, etc.

In operation of medium 1, the magnetic layer 13 is locally magnetized by a write transducer or write head (not shown in FIG. 1 for simplicity) to record and store data/information. The write transducer creates a highly concentrated magnetic field which alternates direction based on the bits of information being stored. When the local magnetic field applied by the write transducer is greater than the coercivity of the recording medium layer 13, then the grains of the polycrystalline medium at that location are magnetized. The grains retain their magnetization after the magnetic field applied by the write transducer is removed. The direction of the magnetization matches the direction of the applied magnetic field. The pattern of magnetization of the recording medium can subsequently produce an electrical response in a read transducer, allowing the stored medium to be read.

Figure 2:
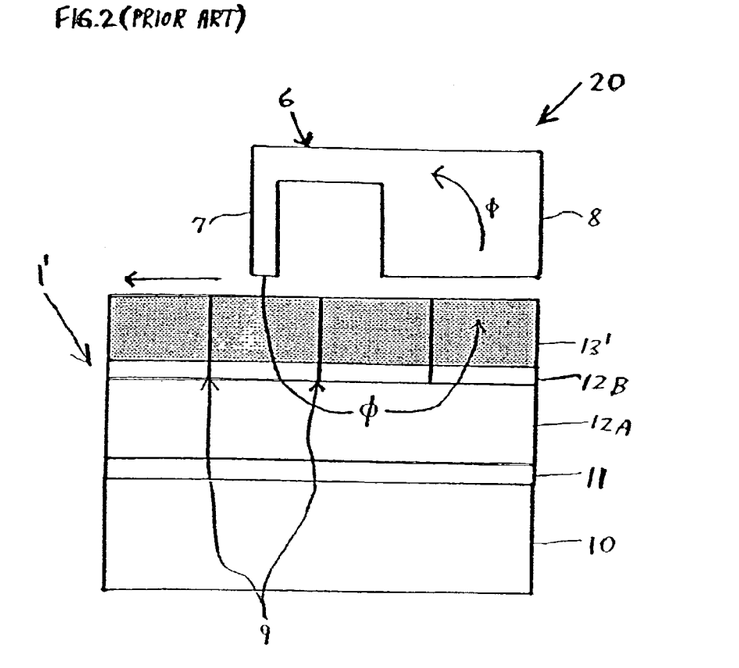
FIG. 2 illustrates, in schematic, simplified cross-sectional view, a portion of a magnetic recording, storage, and retrieval system comprised of a perpendicular-type magnetic recording medium and a single-pole transducer head.

A typical recording system 20 utilizing a thin-film, vertically oriented, perpendicular-type magnetic medium 1' is illustrated in FIG. 2, wherein reference numerals 10, 11, 12A, 12B and 13', respectively, indicate the substrate, plating layer, soft magnetic underlayer, at least one non-magnetic interlayer, and vertically oriented, hard magnetic recording layer of perpendicular-type magnetic medium 1, and reference numerals 7 and 8, respectively, indicate the single and auxiliary poles of single-pole magnetic transducer head 6. Relatively thin interlayer 12B (also referred to as an "intermediate" layer), comprised of one or more layers of non-magnetic materials, serves to (1) prevent magnetic interaction between the soft underlayer 12A and the hard recording layer 13' and (2) promote desired microstructural and magnetic properties of the hard recording layer. As shown by the arrows in the figure indicating the path of the magnetic flux φ, flux φ is seen as emanating from single pole 7 of single-pole magnetic transducer head 6, entering and passing through vertically oriented, hard magnetic recording layer 13' (which, as is known, may comprise a Co-based alloy, an iron oxide, or a multilayer magnetic superlattice structure) in the region above single pole 7, entering and travelling along soft magnetic underlayer 12A for a distance, and then exiting therefrom and passing through vertically oriented, hard magnetic recording layer 13' in the region above auxiliary pole 8 of single-pole magnetic transducer head 6. The direction of movement of perpendicular magnetic medium 1 past transducer head 6 is indicated in the figure by the arrow above medium 1.

With continued reference to FIG. 2, vertical lines 9 indicate grain boundaries of each polycrystalline (i.e., granular) layer of the layer stack constituting medium 1. As apparent from the figure, the width of the grains (as measured in a horizontal direction) of each of the polycrystalline layers constituting the layer stack of the medium is substantially the same, i.e., each overlying layer replicates the grain width of the underlying layer. Not shown in the figure, for illustrative simplicity, are a protective overcoat layer 14, such as of a diamond-like carbon (DLC) formed over hard magnetic layer 13', and a lubricant topcoat layer 15, such as of a perfluoropolyethylene material, formed over the protective overcoat layer. As with the longitudinal-type recording medium 1 shown in FIG. 1, substrate 10 is typically disk-shaped and comprised of a non-magnetic metal or alloy, e.g., Al or an Al-based alloy, such as Al—Mg having an Ni—P plating layer 11 on the deposition surface thereof, or substrate 10 is comprised of a suitable glass, ceramic, glass-ceramic, polymeric material, or a composite or laminate of these materials; soft underlayer 12A is typically comprised of an about 500 to about 4,000 Å thick layer of a soft magnetic material selected from the group consisting of Ni, NiFe (Permalloy), Co, CoZr, CoZrCr, CoZrNb, CoFe, Fe, FeN, FeSiAl, FeSiAlN, etc.; thin interlayer 12B typically comprises an up to about 100 Å thick layer of a non-magnetic material, such as TiCr; and hard magnetic layer 13' is typically comprised of an about 100 to about 250 Å thick layer of a Co-based alloy including one or more elements selected from the group consisting of Cr, Fe, Ta, Ni, Mo, Pt, V, Nb, Ge, and B, iron oxides, such as $Fe_3O_4$ and $\delta\text{-}Fe_2O_3$, or a $(CoX/Pd\ or\ Pt)_n$ multilayer magnetic superlattice structure, where n is an integer from about 10 to about 25, each of the alternating, thin layers of Co-based magnetic alloy is from about 2 to about 3.5 Å thick, X is an element selected from the group consisting of Cr, Ta, B, Mo, and Pt, and each of the alternating thin, non-magnetic layers of Pd or Pt is about 1 Å thick. Each type of hard magnetic recording layer material has perpendicular anisotropy arising from magnetocrystalline anisotropy ($1^{st}$ type) and/or interfacial anisotropy ($2^{nd}$ type).

A typical contact start/stop (CSS) method employed during use of disk-shaped media involves a floating transducer head gliding at a predetermined distance from the surface of the disk due to dynamic pressure effects caused by air flow generated between mutually sliding surfaces of the transducer head and the disk. During reading and recording (writing) operations, the transducer head is maintained at a controlled distance from the recording surface, supported on a bearing of air as the disk rotates, such that the transducer head is freely movable in both the circumferential and radial directions, thereby allowing data to be recorded and retrieved from the disk at a desired position in a data zone.

Figure 3:
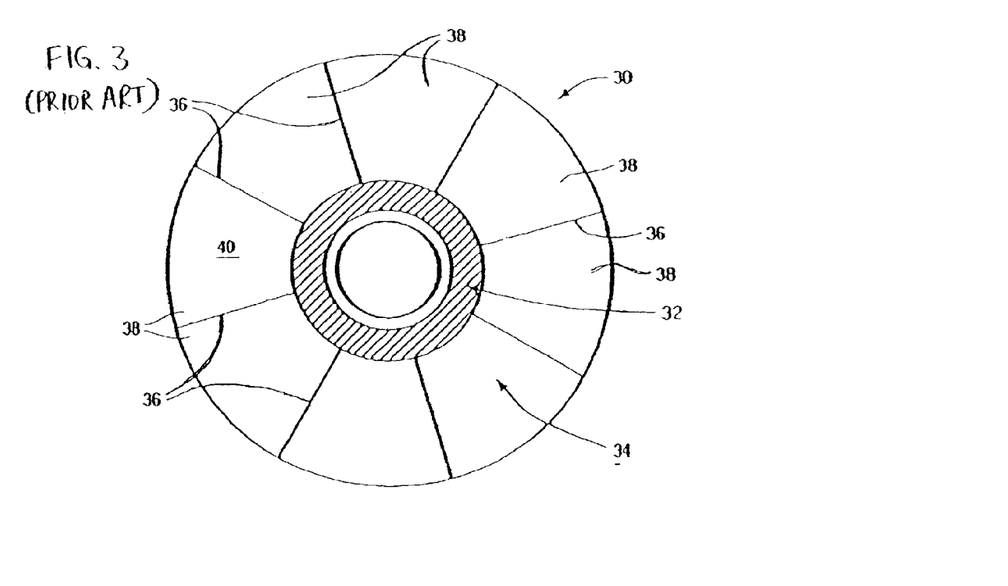
FIG. 3 is a simplified, schematic plan view, of a magnetic recording disk for illustrating the data, servo pattern, and CSS zones thereof.

Adverting to FIG. 3, shown therein, in simplified, schematic plan view, is a magnetic recording disk 30 (of either longitudinal or perpendicular type) having a data zone 34 including a plurality of servo tracks, and a contact start/stop (CSS) zone 32. A servo pattern 40 is formed within the data zone 34, and includes a number of data track zones 38 separated by servo tracking zones 36. The data storage function of disk 30 is confined to the data track zones 38, while servo tracking zones 36 provide information to the disk drive which allows a read/write head to maintain alignment on the individual, tightly-spaced data tracks.

Although only a relatively few of the servo tracking zones are shown in FIG. 3 for illustrative simplicity, it should be recognized that the track patterns of the media contemplated herein may include several hundreds of servo zones to improve head tracking during each rotation of the disk. In addition, the servo tracking zones need not be straight radial zones as shown in the figure, but may instead comprise arcs, intermittent zones, or irregularly-shaped zones separating individual data tracks.

In conventional hard disk drives, data is stored in terms of bits along the data tracks. In operation, the disk is rotated at a relatively high speed, and the magnetic head assembly is mounted on the end of a support or actuator arm, which radially positions the head on the disk surface. If the actuator arm is held stationary, the magnetic head assembly will pass over a circular path on the disk, i.e., over a data track, and information can be read from or written to that track. Each concentric track has a unique radius, and reading and writing information from or to a specific track requires the magnetic head to be located above that track. By moving the actuator arm, the magnetic head assembly is moved radially on the disk surface between tracks. Many actuator arms are rotatable, wherein the magnetic head assembly is moved between tracks by activating a servomotor which pivots the actuator arm about an axis of rotation. Alternatively, a linear actuator may be used to move a magnetic head assembly radially inwardly or outwardly along a straight line.

As has been stated above, to record information on the disk, the transducer creates and applies a highly concentrated magnetic field in close proximity to the magnetic recording medium. During writing, the strength of the concentrated magnetic field directly under the write transducer is greater than the coercivity of the recording medium, and grains of the recording medium at that location are magnetized in a direction which matches the direction of the applied magnetic field. The grains of the recording medium retain their magnetization after the magnetic field is removed. As the disk rotates, the direction of the writing magnetic field is alternated, based on bits of the information being stored, thereby recording a magnetic pattern on the track directly under the write transducer.

On each track, eight "bits" typically form one "byte" and bytes of data are grouped as sectors. Reading or writing a sector requires knowledge of the physical location of the data in the data zone so that the servo-controller of the disk drive can accurately position the read/write head in the correct location at the correct time. Most disk drives use disks with embedded "servo patterns" of magnetically readable information. The servo patterns are read by the magnetic head assembly to inform the disk drive of track location. In conventional disk drives, tracks typically include both data sectors and servo patterns and each servo pattern typically includes radial indexing information, as well as a "servo burst". A servo burst is a centering pattern to precisely position the head over the center of the track. Because of the locational precision needed, writing of servo patterns requires expensive servo-pattern writing equipment and is a time consuming process.

Commonly assigned U.S. Pat. No. 5,991,104 to Bonyhard, the entire disclosure of which is incorporated herein by reference, discloses a method for forming a servo pattern in a magnetic disk, comprising the steps of:

1) aligning a magnetic disk immediately adjacent a master servo-writer medium, the latter having a greater magnetic coercivity than the former, wherein the servo-writer medium has a master servo pattern magnetically stored thereon which defines a plurality of concentric tracks;

2) applying a magnetic assist field to the aligned master servo-writer medium and magnetic disk, the magnetic assist field having a substantially equal magnitude at all tracks on the aligned master servo-writer medium and magnetic disk; and 3) rotating the aligned master servo-writer medium and magnetic disk relative to the magnetic assist field.

However, the above-described method incurs several drawbacks associated with its implementation in an industrially viable manner. Specifically, a "one-of-a-kind" master writer with a very high write field gradient is necessary for writing the requisite high intensity, master magnetic servo pattern onto the master disk, and a complicated means for rotating the aligned master servo-writer disk and "slave" workpiece magnetic disk is required, as is a complex system for controlling/regulating/rotating the intensity (i.e., magnitude) and directions of the magnetic assist field.

Commonly assigned, co-pending U.S. patent application Ser. No. 10/082,178, filed Feb. 26, 2002, the entire disclosure of which is incorporated herein by reference, discloses an improvement over the invention disclosed in the aforementioned commonly assigned U.S. Pat. No. 5,991,104, and is based upon the discovery that very sharply defined magnetic transition patterns can be reliably, rapidly, and cost-effectively formed in a magnetic medium containing a longitudinal or perpendicular type magnetic recording layer: (1) without requiring expensive, complicated fabrication of a master disk (alternatively referred to as a "stamper/imprinter") having a contacting (i.e., imprinting) surface comprised of a plurality of magnets or magnetized areas corresponding to the desired magnetic transition pattern to be formed in the magnetic disk (i.e., "slave"), and (2) without requiring rotation of the master/slave pair in a magnetic assist field of variable strength and polarity.

Specifically, the invention disclosed in co-pending, commonly assigned U.S. patent application Ser. No. 10/082,178 is based upon recognition that a stamper/imprinter ("master") comprised of a magnetic material having a high saturation magnetization, $B_{sat}$, i.e., $B_{sat} \geq$ about 0.5 Tesla, and a high permeability, $\mu$, i.e., $\mu \geq$ about 5, e.g., selected from Ni, NiFe, CoNiFe, CoSiFe, CoFe, and CoFeV, can be effectively utilized as a "master" contact mask (or "stamper/imprinter") for "imprinting" of a magnetic transition pattern, e.g., a servo pattern, in the surface of a magnetic recording layer of a magnetic medium ("slave"), whether of longitudinal or perpendicular type. A key feature of the invention is the use of a stamper/imprinter having an imprinting surface including a topographical pattern, i.e., comprised of projections and depressions, corresponding to a desired magnetic transition pattern, e.g., a servo pattern, to be formed in the magnetic recording layer. An advantage afforded by the invention is the ability to fabricate the topographically patterned imprinting surface of the stamper/imprinter, as well as the substrate or body therefor, of a single material, as by use of well-known and economical electro-forming techniques.

According to the disclosed invention, the magnetic domains of the magnetic recording layer of the slave medium are first unidirectionally aligned (i.e., "erased" or "initialized"), as by application of a first external, unidirectional magnetic field $H_{initial}$ of first direction and high strength greater than the saturation field of the magnetic recording layer, typically $\geq 2,000$ and up to about 20,000 Oe. The imprinting surface of the stamper/imprinter (master) is then brought into intimate (i.e., touching) contact with the surface of the magnetic recording layer (slave). With the assistance of a second externally applied magnetic field of second, opposite direction and lower but appropriate strength $H_{re-aligns}$ determined by $B_{sat}/\mu$ of the stamper material (typically $\geq 100$ Oe, e.g., from about 2,000 to about 4,500 Oe), the alignment of the magnetic domains at the areas of contact between the projections of the imprinting surface of the stamper/imprinter or at the areas facing the depressions of the imprinting surface of the stamper/imprinter and the magnetic recording layer of the medium to be patterned (slave) is selectively reversed, while the alignment of the magnetic domains at the non-contacting areas (defined by the depressions in the imprinting surface of the stamper/imprinter) or at the contacting areas, respectively, is unaffected, whereby a sharply defined magnetic transition pattern is created within the magnetic recording layer of the medium to be patterned (slave) which essentially mimics the topographical pattern of projections and depressions of the imprinting surface (master). According to the invention, high $B_{sat}$ and high $\mu$ materials are preferred for use as the stamper/imprinter in order to: (1) avoid early magnetic saturation of the stamper/imprinter at the contact points between the projections of the imprinting surface and the magnetic recording layer, and (2) provide an easy path for the magnetic flux lines which enter and/or exit at the side edges of the projections.

Stampers/imprinters for use in a typical application according to the disclosed invention, e.g., servo pattern formation in the recording layer of a disk-shaped, thin film, longitudinal or perpendicular magnetic recording medium, are formed according to conventional techniques, and typically comprise an imprinting surface having topographical features consisting of larger area data zones separated by smaller areas with well-defined patterns of projections and depressions corresponding to conventionally configured servo sectors, as for example, disclosed in the aforementioned commonly assigned U.S. Pat. No. 5,991,104. For example, a suitable topography for forming the servo sectors may comprise a plurality of projections having a height in the range from about 20 to about 500 nm, a width in the range from about 0.01 to about 1 µm, and a spacing of at least about 0.01 µm. Stampers/imprinters comprising imprinting surfaces with suitable surface topographies may be readily formed by a variety of techniques, such as electroforming onto a planar-surfaced substrate through an apertured, non-conductive mask, or by pattern formation in a planar-surfaced substrate by means photolithographic wet (i.e., chemical) or dry (e.g., plasma, sputter, or ion beam) etching techniques.

Figure 4:
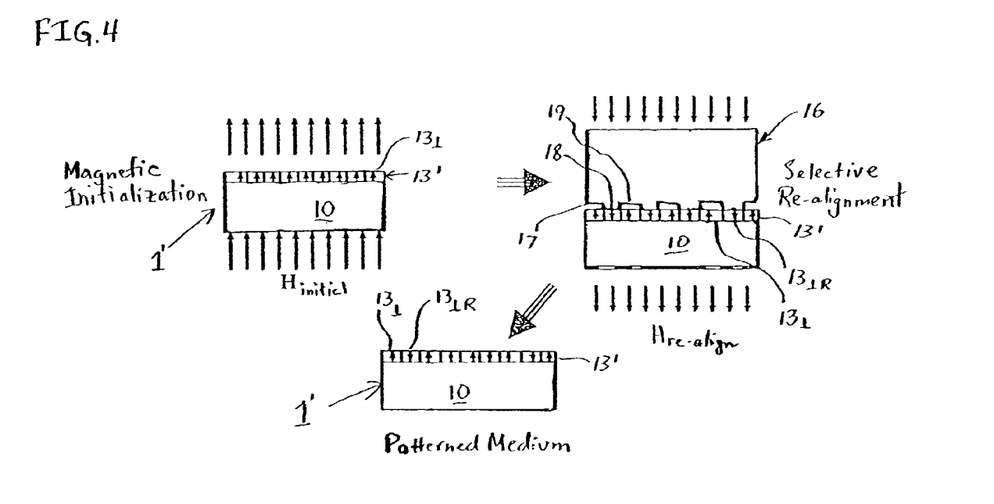
FIG. 4 illustrates, in schematic, simplified cross-sectional view, a sequence of process steps performed according to the invention for creating a magnetic transition pattern in the surface of a perpendicular magnetic recording layer, utilizing a stamper/imprinter having an imprinting surface corresponding to the desired magnetic transition pattern and formed of a high saturation magnetization, high permeability magnetic material.

FIG. 4 illustrates a sequence of steps for performing magnetic transition patterning by contact printing of a perpendicular recording medium, e.g., medium 1' depicted in FIG. 2 and comprised of a non-magnetic substrate 10 and an overlying thin layer 13' of a perpendicular-type magnetic recording material (where plating layer 11, soft magnetic underlayer 12A, and non-magnetic interlayer 12B are omitted from FIG. 4 in order to not unnecessarily obscure the essential features/aspects of the present invention) is subjected to a DC erase or magnetic initialization process for unidirectionally aligning the perpendicularly oriented magnetic domains $13_\perp$ of magnetic recording layer 13'. Magnetic initialization of perpendicular medium 1' is accomplished by applying a first, high strength, unidirectional DC magnetic initialization field $H_{initial}$ normal to the opposed major surfaces thereof, i.e., normal to the lower surface of substrate 10 and upper surface of magnetic recording layer 13', wherein $H_{initial} \geq$ coercivity of layer 13' and is typically in the range from above about 2,000 to about 20,000 Oe.

According to the next step of the process sequence, a stamper/imprinter 16 composed of composed of a body of magnetic material having a high saturation magnetization, $B_{sat}$, i.e., $B_{sat} \geq$ about 0.5 Tesla, and a high permeability, µ, i.e., µ $\geq$ about 5, e.g., selected from Ni, NiFe, CoNiFe, CoSiFe, CoFe, and CoFeV, and having an imprinting surface 17 having a topography comprised of a plurality of projections 18 and depressions 19 arranged in a pattern corresponding to a magnetic transition pattern to be formed in the surface of magnetic recording layer 13', e.g., a plurality of data zones separated by servo sectors, is placed in intimate (i.e., touching) contact with the surface of layer 13'. By way of illustration only, a suitable topography for the imprinting surface 17 of a contact mask-type stamper/imprinter 16 for use in forming a recording medium with data zones separated by servo sectors according to the invention may comprise a plurality of projections 18 having a height in the range from about 20 to about 500 nm, a width in the range from about 0.01 to about 1 µm, and a spacing (defining the depressions 19) of at least about 0.01 µm). A second, unidirectional DC magnetic re-alignment field $H_{re-align}$ of direction reverse that of the DC magnetic initialization field $H_{initial}$ is then applied normal to the upper surface of stamper/imprinter 16 and the lower surface of substrate 10 of medium 1', the strength of $H_{re-align}$ being lower than that of $H_{initial}$ and optimized at a value determined by $B_{sat}/\mu$ of the stamper material (typically $\geq 100$ Oe, e.g., from about 2,000 to about 4,500 Oe for the above-listed high $B_{sat}$, high µ materials). According to the invention, due to the high permeability µ of the stamper material, the magnetic flux φ provided by the re-alignment field $H_{re-align}$ tends to concentrate at the projections 18 of the stamper/imprinter 16, which projections are in touching contact with the surface of magnetic recording layer 13'. As a consequence, the surface areas of magnetic recording layer 13' immediately beneath the projections 18 experience a significantly higher magnetic field than the surface areas at the non-contacting areas facing the depressions 19. If the re-alignment field strength $H_{re-align}$ is optimized (e.g., as described supra), the direction of magnetization (i.e., alignment) of the perpendicularly oriented magnetic domains $13_\perp$ is selectively reversed (as indicated by the arrows in the figure) at the areas of the magnetic recording layer 13' where the projections 18 of the imprinting surface 17 of the stamper/imprinter 16 contact the surface of the magnetic recording layer 13', and the magnetic alignment of the perpendicularly oriented magnetic domains $13_\perp$ facing the depressions 19 in the imprinting surface 17 is retained. Consequently, upon removal of the stamper/imprinter 16 and the re-alignment field $H_{re-align}$ in the next (i.e., final) step according to the inventive methodology, a perpendicular recording medium 1' is formed with a magnetic transition pattern comprising a plurality of data zones separated by servo sectors each comprising a plurality of reversely oriented perpendicular magnetic domains $13_{\perp R}$ corresponding to the desired servo pattern.

Figure 5:
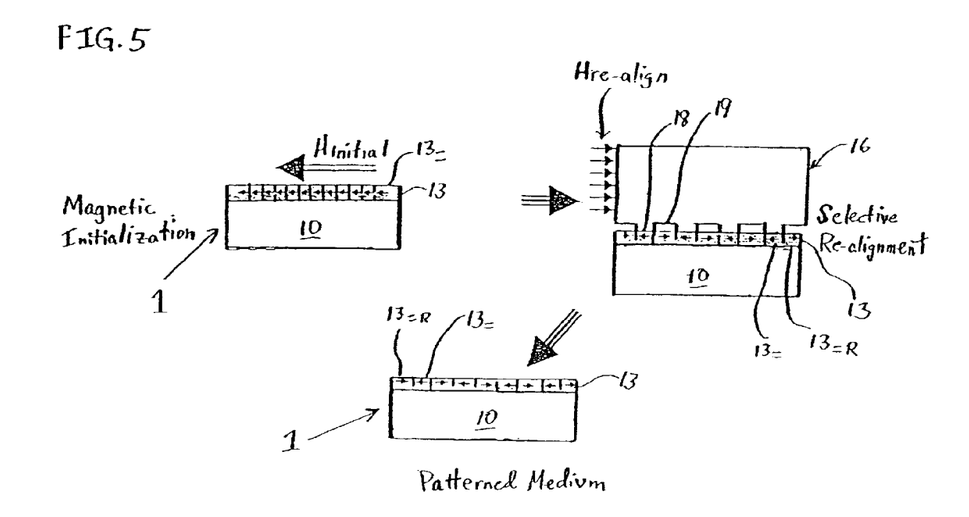
FIG. 5 illustrates, in schematic, simplified cross-sectional view, a similar sequence of process steps performed according to the invention for creating a magnetic transition pattern in the surface of a longitudinal magnetic recording layer.

FIG. 5 illustrates a similar sequence of steps for performing magnetic transition patterning by contact printing of a longitudinal recording medium, e.g., medium 1 depicted in FIG. 1 and comprised of a non-magnetic substrate 10 and an overlying thin layer 13 of a longitudinal-type magnetic layer (where plating layer 11, polycrystalline underlayer 12, protective overcoat layer 14, and lubricant topcoat layer 15 are omitted from FIG. 5 in order not to unnecessarily obscure the essential features/aspects of the present invention) is initially subjected to a magnetic erase (or "initialization") process for unidirectionally aligning the longitudinally oriented magnetic domains $13_{=}$ of magnetic recording layer 13. Magnetic initialization of longitudinal medium 1 is accomplished by applying a first, high strength, unidirectional magnetic field $H_{initial}$ parallel to the surface of the magnetic recording layer, such that $H_{initial} \geq$ coercivity of layer 13' and is typically in the range from about 2,000 to about 20,000 Oe. In this instance, $H_{initial}$ is applied perpendicularly (i.e., normal) to the side edges of medium 1, whereas, by contrast, $H_{initial}$ for a perpendicular medium would be applied normal to the upper and lower major surfaces of the medium.

According to the next step of the process sequence, a stamper/imprinter 16 comprised of a body of magnetic material having a high saturation magnetization, $B_{sat}$, i.e., $B_{sat} \geq$ about 0.5 Tesla, and a high permeability, $\mu$, i.e., $\mu \geq$ about 5, e.g., selected from Ni, NiFe, CoNiFe, CoSiFe, CoFe, and CoFeV, and having an imprinting surface 17 having a topography comprised of a plurality of projections 18 and depressions 19 arranged in a pattern corresponding to a magnetic transition pattern to be formed in the surface of magnetic recording layer 13, e.g., a plurality of data zones separated by servo sectors, is placed in intimate (i.e., touching) contact with the surface of layer 13. By way of illustration only, a suitable topography for the imprinting surface 17 of a contact mask-type stamper/imprinter 16 for use in forming a recording medium with data zones separated by servo sectors in longitudinal recording layer 13 according to the invention may comprise a plurality of projections 18 having a height in the range from about 20 to about 500 nm, a width of at least about 0.01 µm, and a spacing (defining the depressions 19) in the range from about 0.01 to about 1 µm. A second, unidirectional magnetic re-alignment field $H_{re-align}$ parallel to the major surface of magnetic recording layer 13 but of lower strength and direction reverse that of the magnetic initialization field $H_{initial}$ is then applied normal to the side edge surfaces of stamper/imprinter 16, the strength of $H_{re-align}$ being optimized at a value determined by $B_{sat}/\mu$ of the stamper material (typically $\geq$ 100 Oe, e.g., from about 2,000 to about 4,500 Oe for the above-listed high $B_{sat}$, high $\mu$ materials). According to the invention, due to the high permeability $\mu$ of the stamper material, the magnetic flux $\phi$ provided by the re-alignment field $H_{re-align}$ enters and exits the side edges of the projections and tends to concentrate at the depressions 19 of the stamper/imprinter 16 (rather than at the projections 18). As a consequence, the non-contacted surface areas of magnetic recording layer 13 immediately beneath the depressions 19 experience a significantly higher magnetic field than the surface areas of the magnetic recording layer 13 in contact with the projections 18. If the re-alignment field strength $H_{re-align}$ is optimized, the direction of magnetization (i.e., alignment) of the longitudinally oriented magnetic domains $13_{=}$ of the magnetic recording layer 13 will be selectively reversed (as indicated by the arrows in the figure) at the areas facing the depressions 19 of the imprinting surface 17 of the stamper/imprinter 16, whereas the alignment of the longitudinally oriented magnetic domains $13_{=}$ of the magnetic recording layer 13 in contact with the projections 18 of the imprinting surface 17 of the stamper/imprinter 16 will be retained. Consequently, upon removal of the stamper/imprinter 16 and the re-alignment field $H_{re-align}$ in the next (i.e., final) step according to the inventive methodology, a longitudinal recording medium 1 is formed with a magnetic transition pattern comprising a plurality of data zones separated by servo sectors each comprising of a plurality of reversely longitudinally oriented magnetic domains $13_{=R}$ corresponding to the desired servo pattern.

Figure 6A:
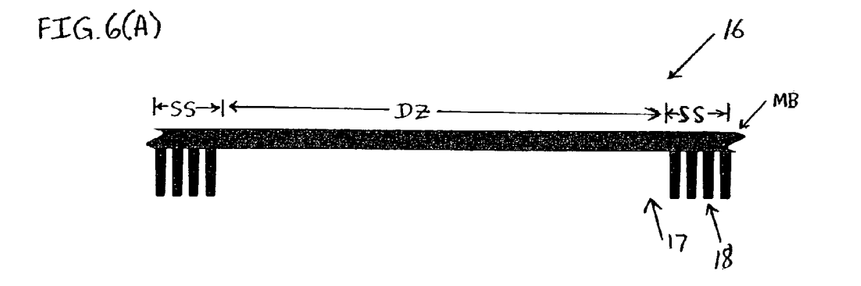
Figure 8A:
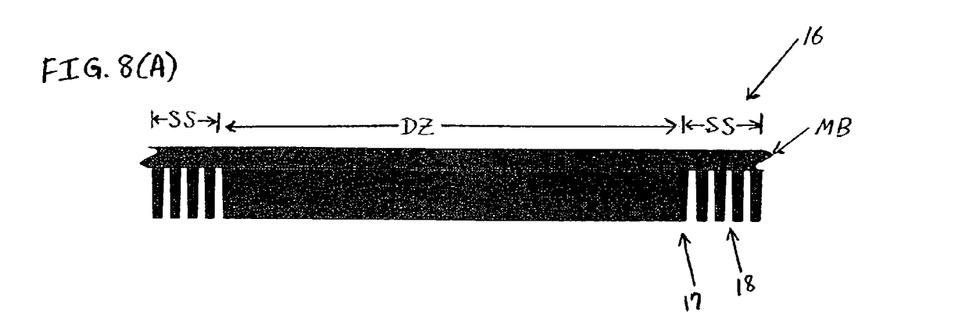

Referring to FIGS. 6 (A) and 8 (A), portions of first and second types of conventionally configured stampers/imprinters 16 for performing contact printing are illustrated (not to scale) in simplified, schematic cross-section, which stampers/imprinters 16 each comprise an imprinting surface 17 including a plurality of larger area data zones DZ (only one such zone being shown in the figure for illustrative simplicity), which data zones typically occupy about 80–90% of the surface area of the imprinting surface, and are separated by pairs of smaller area servo sectors SS occupying the remaining 10–20% of the surface area of the imprinting surface. Servo sectors SS are defined by a plurality of protrusions or fingers 18 extending from the main body MB of the stamper 16, which protrusions are spaced apart by depressions 19.

According to the first type of stamper, shown in FIG. 6 (A), the unpatterned, larger area data zones DZ are not designed to contact the media surface during contact printing and thus are recessed relative to the protrusions or fingers 18 of the servo sectors SS; whereas, according to a second type of stamper, shown in FIG. 8 (A), the unpatterned, larger area data zones DZ are designed to contact the media surface during contact printing, and therefore project to the same level or height as the projections of the servo sectors SS.

Figure 6B:
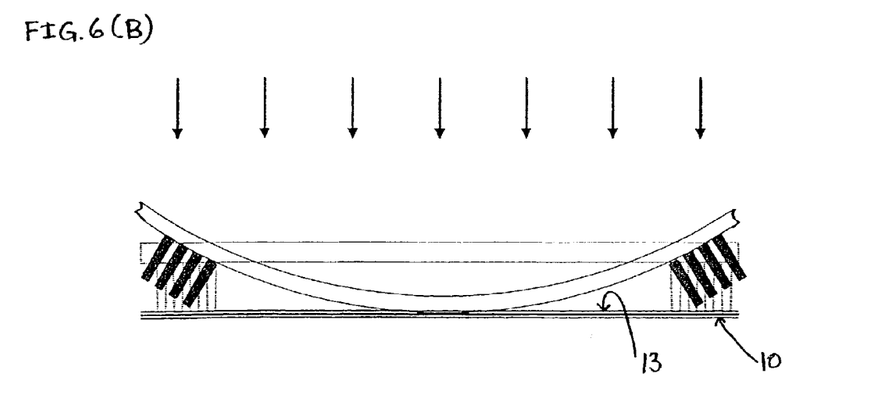
Figure 7:
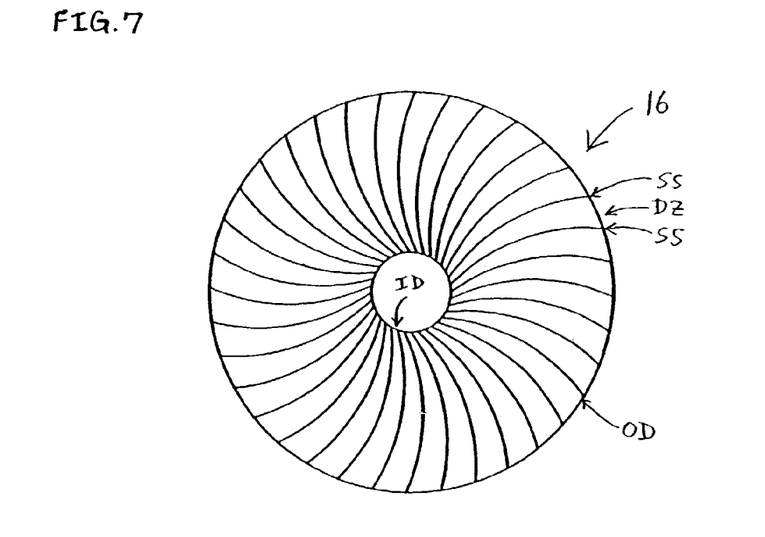
FIG. 7 is a plan view of the imprinting surface of an annular disk-shaped embodiment of the conventionally configured stamper/imprinter shown in FIGS. 6 (A) and 6 (B)

FIG. 7 is a plan view of the imprinting surface of an annular disk-shaped embodiment of the first type of conventionally configured stamper/imprinter 16 illustrated in FIGS. 6 (A) and 6 (B), showing a plurality of data zones DZ separated by servo sectors SS in the form of radially extending partial spirals originating at the inner diameter ID and extending to the outer diameter OD, wherein the servo sectors SS occupy about 10 to about 20% of the imprinting surface (with the data zones DZ occupying about 80 to about 90% of the imprinting surface) and are comprised of a plurality of projections (best seen in FIG. 6) having a height in the range from about 20 to about 500 nm, a width in the range from about 0.01 to about 1 µm, and a spacing between adjacent projections of at least about 0.01 µm.

In use, however, stampers/imprinters 16 of the first type shown in FIGS. 6–7, wherein the unpatterned data zones DZ are recessed relative to the protruding servo sectors SS, incur a problem in that flexural deformation/distortion of the stamper/imprinter occurs, as schematically illustrated (in an extreme or exaggerated case) in FIG. 6 (B), when a downwardly directed pressure (as shown by the arrows in the figure) is applied during the contact printing process for placing the imprinting surface 17 in intimate contact with the surface of the magnetic recording layer 13 of the medium to be patterned. As a consequence of the poor/uneven contact between the pattern features 18 of imprinting surface 17 and the surface of the magnetic recording layer 13, the resultant servo pattern is distorted, in turn leading to poor servo performance.

Figure 8B:
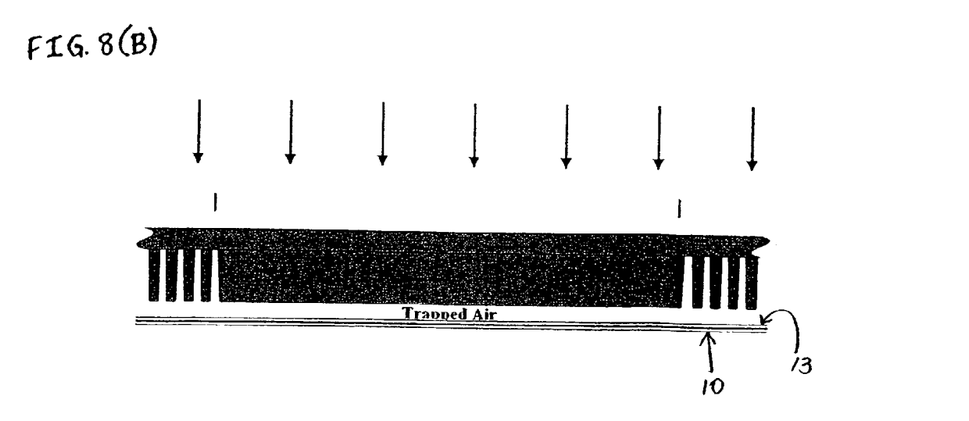
Figure 9:
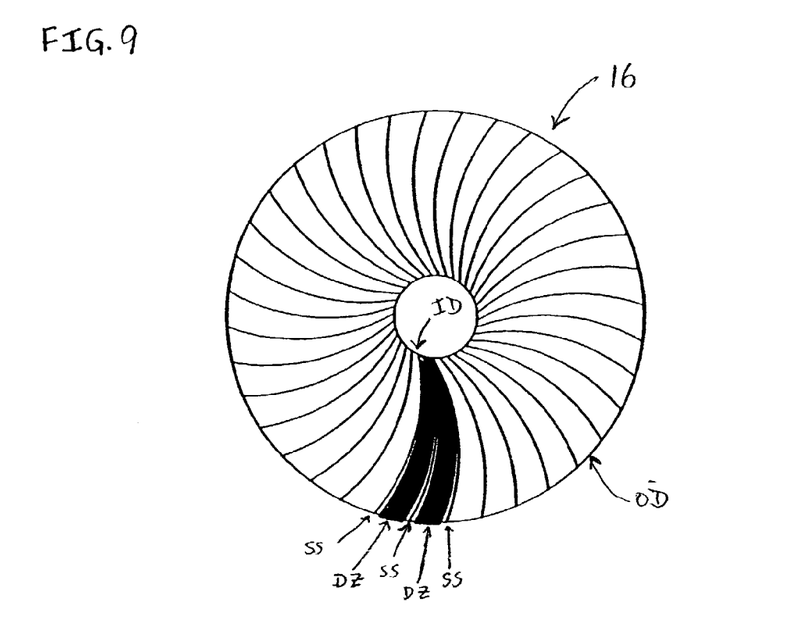
FIG. 9 is a plan view of the imprinting surface of an annular disk-shaped embodiment of a conventionally configured stamper/imprinter corresponding to that shown in cross-sectional view in FIGS. 8 (A) and 8 (B)

FIG. 9 is a plan view of the imprinting surface of an annular disk-shaped embodiment of the second type of conventionally configured stamper/imprinter 16 illustrated in FIGS. 8 (A) and 8 (B), showing a plurality of projecting data zones DZ (with only 2 such projecting data zones DZ shown in black for illustrative convenience) separated by servo sectors SS in the form of radially extending partial spirals originating at the inner diameter ID and extending to the outer diameter OD, wherein the servo sectors SS occupy about 10 to about 20% of the imprinting surface (with the data zones DZ occupying about 80 to about 90% of the imprinting surface) and are comprised of a plurality of projections (best seen in FIG. 8) having a height in the range from about 20 to about 500 nm, a width in the range from about 0.01 to about 1 μm, and a spacing between adjacent projections of at least about 0.01 μm, wherein each of the projecting data zones DZ (also best seen in FIG. 8) has a height substantially equal to the height of the projections forming the servo sectors SS.

Stampers/imprinters 16 of the second type shown in FIGS. 8–9, while substantially free of the problem of pressure-induced, flexural deformation/distortion associated with use of the first type of stamper/imprinter 16, incur a different problem, as schematically shown (also in an extreme or exaggerated case) in FIG. 8 (B), in that air pockets tend to become entrapped in the space between the imprinting surface 17 and the surface of the magnetic recording layer 13 as the imprinting surface 17 approaches the surface of the magnetic recording layer 13, which pockets of entrapped air form particularly in the regions where the unpatterned data zones DZ face the media surface, leading to poor contact/separation between the imprinting surface 17 and surface of the magnetic recording layer 13. The poor contact in turn leads to loss of resolution of the resultant magnetic transition pattern of the servo sectors SS, hence poor servo performance.

Accordingly, there exists a need for means and methodology for performing servo patterning by contact printing which are free of the above-described drawbacks and disadvantages associated with the use of conventionally-configured/structured stampers/imprinters, and facilitate high quality replication of servo patterns in magnetic recording media via contact printing. Moreover, there exists a need for methodology and means, e.g., improved stampers/imprinters for performing rapid, cost-effective servo patterning of thin film, high areal recording density magnetic recording media which do not engender the above-stated concerns and disadvantages associated with existing methodologies/instrumentalities for patterning magnetic recording media by contact printing.

The present invention addresses and solves the above-described problems, disadvantages, and drawbacks associated with prior methodologies for servo pattern formation in thin film magnetic recording media, while maintaining full compatibility with the requirements of automated hard disk manufacturing technology.

DISCLOSURE OF THE INVENTION

An advantage of the present invention is an improved apparatus for performing contact printing of a magnetic transition pattern in a magnetic recording medium.

Another advantage of the present invention is an improved apparatus for performing contact printing of servo patterns in longitudinal or perpendicular magnetic recording media.

Yet another advantage of the present invention is an improved method for performing contact printing of a magnetic transition pattern in a magnetic recording medium.

Another advantage of the present invention is an improved method for performing contact printing of servo patterns in longitudinal or perpendicular magnetic recording media.

Additional advantages and other features of the present invention will be set forth in the description which follows and in part will become apparent to those having ordinary skill in the art upon examination of the following or may be learned from the practice of the present invention. The advantages of the present invention may be realized as particularly pointed out in the appended claims.

According to one aspect of the present invention, the foregoing and other advantages are obtained in part by an apparatus for performing contact printing of a magnetic transition pattern in a magnetic recording medium, comprising:

(a) a stamper/imprinter including a body formed of at least one magnetic material having a high saturation magnetization $B_{sat} \geq$ about 0.5 Tesla and a high permeability $\mu \geq$ about 5, the body including an imprinting surface adapted to be placed in intimate contact with a surface of a magnetic layer, the imprinting surface comprised of a plurality of patterned areas which separate a plurality of areas which are not patterned, each of the plurality of areas which is not patterned being provided with at least one of:

(i) mechanical reinforcing means for preventing deformation of the body when the imprinting surface is urged into contact with the surface of the magnetic layer; and (ii) gas venting means for facilitating removal of air or other gas from between the imprinting surface and the surface of the magnetic layer when the imprinting surface is urged into contact with the surface of the magnetic layer.

According to embodiments of the present invention, each of the plurality of patterned areas of the imprinting surface forms an image of a servo sector to be formed in the magnetic layer and each of the areas which is not patterned corresponds to a data zone to be formed in the magnetic layer; the plurality of patterned areas forming the servo sectors occupy from about 2 to about 20% of the imprinting surface and the plurality of areas corresponding to the data zones which are not patterned occupy from about 80 to about 98% of the imprinting surface; each of the plurality of patterned areas of the imprinting surface includes a plurality of projections forming the image of the servo sectors; each of the plurality of projections has a height in the range from about 20 to about 500 nm, a width in the range from about 0.01 to about 1 μm, and a spacing between adjacent projections of at least about 0.01 μm.

In accordance with certain embodiments of the present invention, each of the plurality of areas corresponding to the data zones which are not patterned is recessed relative to the projections forming the image of the servo sectors; each of the recessed areas corresponding to the data zones comprises mechanical reinforcing means (i) in the form of a plurality of spaced-apart projections; adjacent ones of the plurality of spaced-apart projections comprising the mechanical reinforcing means (i) form channels in the data zones comprising the gas venting means (ii); and the imprinting surface is annular disk-shaped with inner and outer diameters, each of the plurality of patterned areas forming the servo sectors comprises a plurality of parallel spaced-apart projections extending radially in partial spirals originating at the inner diameter and extending to the outer diameter, and the plurality of spaced-apart projections comprising the mechanical reinforcing means (i) in the data zones form the gas venting means (ii) as parallel spaced-apart channels extending radially in partial spirals originating at the inner diameter and extending to the outer diameter.

According to certain other embodiments of the present invention, each of the plurality of areas corresponding to the data zones which are not patterned is in the form of a projection extending to the same height as the projections forming the negative image of the servo sectors; and the imprinting surface is annular disk-shaped with inner and outer diameters, each of the plurality of patterned areas forming the servo sectors comprises a plurality of parallel spaced-apart projections extending radially in partial spirals originating at the inner diameter and extending to the outer diameter, and each of the data zones comprises a plurality of gas venting means (ii) in the form of parallel spaced-apart channels extending radially in partial spirals originating at the inner diameter and extending to the outer diameter.

Embodiments of the present invention include those wherein the body of the stamper/imprinter formed of at least one magnetic material having a high saturation magnetization $B_{sat} \geq$ about 0.5 Tesla and a high permeability $\mu \geq$ about 5 comprises at least one material selected from the group consisting of Ni, NiFe, CoNiFe, CoSiFe, CoFe, and CoFeV.

Further embodiments of apparatus according to the present invention additionally comprise:

(b) magnet means for applying a unidirectional magnetic field to the stamper/imprinter for effecting selective re-alignment of magnetic domains of a magnetic material in contact with the imprinting surface of the stamper/imprinter.

Another aspect of the present invention is a method of forming a magnetic transition pattern in a surface of a magnetic material, comprising the sequential steps of:

(a) providing a workpiece including a surface comprised of the magnetic material, the magnetic material including a plurality of magnetic domains extending to the surface;

(b) unidirectionally aligning the magnetic domains of the magnetic material in a first direction;

(c) contacting the surface of the magnetic material with an imprinting surface of a stamper/imprinter, the stamper/imprinter including a body formed of at least one magnetic material having a high saturation magnetization $B_{sat} \geq$ about 0.5 Tesla and a high permeability $\mu \geq$ about 5, the body including an imprinting surface adapted to be placed in intimate contact with the surface of the magnetic material, the imprinting surface comprised of a plurality of projections and depressions arranged in a pattern corresponding to the magnetic transition pattern to be formed in the surface of the magnetic material and including a plurality of patterned areas which separate a plurality of areas which are not patterned, each of the plurality of areas which is not patterned being provided with at least one of:

(i) mechanical reinforcing means for preventing deformation of the body when the imprinting surface is urged into contact with the surface of the magnetic layer; and
  (ii) gas venting means for facilitating removal of air or other gas from between the imprinting surface and the surface of the magnetic layer when the imprinting surface is urged into contact with the surface of the magnetic layer;

(d) selectively re-aligning the magnetic domains of those portions of the surface of the magnetic material which are in contact with the projections or which face the depressions of the imprinting surface of the stamper, such that the magnetic domains of the contacted portions or the facing portions are unidirectionally aligned in a second direction reverse that of the first direction and the combination of aligned+re-aligned magnetic domains forms a pattern replicating the pattern of the projections and depressions; and (e) removing the stamper from contact with the surface of the magnetic material.

According to embodiments of the present invention, step (c) comprises contacting the surface of the magnetic material with an imprinting surface of a stamper/imprinter wherein each of the plurality of patterned areas of the imprinting surface includes a plurality of projections forming an image of a servo sector to be formed in the magnetic layer and each of the areas which is not patterned corresponds to a data zone to be formed in the magnetic layer.

In accordance with certain embodiments of the present invention, each of the plurality of areas corresponding to the data zones which are not patterned is recessed relative to the projections forming the images of the servo sectors; each of the recessed areas corresponding to the data zones comprises mechanical reinforcing means (i) in the form of a plurality of spaced-apart projections, adjacent ones of the plurality of spaced-apart projections comprising the mechanical reinforcing means (i) form channels in the data zones comprising the gas venting means (ii); and the imprinting surface is annular disk-shaped with inner and outer diameters, each of the plurality of patterned areas forming the servo sectors comprises a plurality of parallel spaced-apart projections extending radially in partial spirals originating at the inner diameter and extending to the outer diameter, and the plurality of spaced-apart projections comprising the mechanical reinforcing means (i) in the data zones form the gas venting means (ii) as parallel spaced-apart channels extending radially in partial spirals originating at the inner diameter and extending to the outer diameter.

According to certain other embodiments of the present invention, each of the plurality of areas corresponding to the data zones which are not patterned is in the form of a projection extending to the same height as the projections forming the images of the servo sectors; the imprinting surface is annular disk-shaped with inner and outer diameters, each of the plurality of patterned areas forming the servo sectors comprises a plurality of parallel spaced-apart projections extending radially in partial spirals originating at the inner diameter and extending to the outer diameter, and each of the plurality of data zones comprises a plurality of gas venting means (ii) in the form of parallel spaced-apart channels extending radially in partial spirals originating at the inner diameter and extending to the outer diameter.

According to embodiments of the present invention, the method further comprises a step of:

(f) erasing any magnetic transition patterns formed in step (d) in portions of the magnetic layer corresponding to the plurality of areas of the imprinting surface of the stamper/imprinter which are not patterned.

Further embodiments of the present invention include those wherein:

step (a) comprises providing a disk-shaped workpiece for a magnetic recording medium, the workpiece including a non-magnetic substrate with a layer of a magnetic recording material overlying a surface thereof, the substrate comprised of a non-magnetic material selected from the group consisting of Al, NiP-plated Al, Al—Mg alloys, other Al-based alloys, other non-magnetic metals, other non-magnetic metal-based alloys, glass, ceramics, polymers, glass-ceramics, and composites and/or laminates thereof;

step (b) comprises placing the workpiece in a first unidirectional DC magnetic field having a first direction and a high strength sufficient to align each of the magnetic domains in the first direction;

step (c) comprises contacting the surface of the magnetic material with the imprinting surface of a stamper formed of at least one magnetic material having high saturation magnetization and high permeability, selected from the group consisting of Ni, NiFe, CoNiFe, CoSiFe, CoFe, and CoFeV, the stamper/imprinter having an imprinting surface including a plurality of projections and depressions arranged in a pattern corresponding to a servo pattern to be formed in the surface of the magnetic material; and step (d) comprises placing the workpiece with the imprinting surface of the stamper in contact therewith in a second unidirectional DC magnetic field having a second direction opposite the first direction and a lower but sufficient strength to selectively reverse the alignment of the magnetic domains of the portions of the magnetic material which are in contact with the projections or face the depressions of the imprinting surface of the stamper, while retaining the first direction alignment of the magnetic domains of the portions of the magnetic material facing the depressions or the projections, respectively, of the imprinting surface of the stamper.

According to certain embodiments of the present invention, step (a) comprises providing a workpiece including a layer of a perpendicular magnetic recording material;

step (b) comprises placing the workpiece in a first unidirectional DC magnetic field having a first direction perpendicular to the surface of the layer of perpendicular magnetic recording material and a high strength sufficient to align each of the magnetic domains along the first direction; and step (c) comprises placing the workpiece with the imprinting surface of the stamper in contact therewith in a second unidirectional DC magnetic field having a second direction opposite the first direction and a lower but sufficient strength to selectively reverse the alignment of the magnetic domains of the portions of the magnetic material in contact with the projections of the imprinting surface of the stamper, while retaining the first direction alignment of the magnetic domains of the portions of the magnetic material facing the depressions of the imprinting surface of the stamper, the stamper having an imprinting surface including a plurality of projections and depressions arranged in a pattern corresponding to a servo pattern to be formed in the surface of the layer of perpendicular magnetic recording material.

In accordance with certain other embodiments of the present invention, step (a) comprises providing a workpiece including a layer of a longitudinal magnetic recording material;

step (b) comprises placing the workpiece in a first, unidirectional DC magnetic field having a first direction parallel to the surface of the layer of longitudinal magnetic recording material and a high strength sufficient to align each of the magnetic domains along the first direction; and step (c) comprises placing the workpiece with the imprinting surface of the stamper in contact therewith in a second unidirectional DC magnetic field parallel to the surface of the longitudinal magnetic recording layer but having a second direction opposite the first direction and a lower but sufficient strength to selectively reverse the alignment of the magnetic domains of the portions of the magnetic recording layer facing the depressions of the imprinting surface of the stamper, while retaining the first direction alignment of the magnetic domains of the portions of the magnetic recording layer in contact with the projections of the imprinting surface of the stamper, the stamper having an imprinting surface including a plurality of projections and depressions arranged in a pattern corresponding to a servo pattern to be formed in the surface of the layer of longitudinal magnetic recording material.

Yet another aspect of the present invention is a stamper/imprinter for performing contact printing of a magnetic transition pattern in the surface of a magnetic recording medium, comprising:

(a) a body formed of at least one magnetic material having a high saturation magnetization and high permeability and including a patterned imprinting surface; and (b) means for preventing deformation of the body during use and/or for venting air or other gas from the imprinting surface during use.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features, and in which like reference numerals are employed throughout to designate similar features, wherein:

FIGS. 6 (A) and 6 (B) illustrate, in schematic, simplified cross-sectional view, a portion of a conventionally configured stamper/imprinter comprised of projection-patterned servo sectors SS and recessed, unpatterned data zones DZ, prior to and during use, respectively;

FIGS. 8 (A) and 8 (B) illustrate, in schematic, simplified cross-sectional view, a portion of a conventionally configured stamper/imprinter comprised of projection-patterned servo sectors SS and projecting, unpatterned data zones DZ, prior to and during use, respectively;

FIGS. 10 (A) and 10 (B) illustrate, in schematic, simplified cross-sectional view, a portion of an embodiment of a stamper/imprinter according to the invention, comprised of projection-patterned servo sectors SS and recessed, unpatterned data zones DZ modified to include a plurality of mechanical reinforcement ribs R, prior to and during use in patterning a magnetic recording medium, respectively;

DESCRIPTION OF THE INVENTION

The present invention addresses and solves problems and drawbacks attendant upon use of conventionally configured stampers/imprinters utilized in performing high quality contact printing of recording layers of magnetic recording media for forming magnetic transition patterns therein, e.g., servo patterns, in a cost-efficient manner at high product throughput rates. Specifically, the present invention is based upon recognition by the inventors that modification of the design of the imprinting surfaces of the stampers/imprinters currently employed for patterning of magnetic recording media via contact printing is necessary for obtaining further improvement in pattern replication fidelity and product quality. The present invention, therefore, has as its aim or objective, improvement of the design features of the imprinting surfaces of the stampers/imprinters in order to eliminate, or at least substantially reduce, the tendency for occurrence of poor or uneven contact with the surface of the magnetic layer or material to be patterned.

A feature of the present invention, in the case of stampers/imprinters wherein the unpatterned data zones are recessed relative to the patterned servo sectors and thus are not intended to contact the surface of the magnetic material or layer during patterning, as for example shown in FIGS. 6 (A)–6 (B) and 7, is the provision of a plurality of mechanical reinforcement means in the data zone, e.g., a plurality of spaced-apart, radially extending reinforcing ribs in the form of projections of the same height as the projections of the servo sector patterns, which reinforcing ribs provide additional mechanical support of the imprinting surface of the stamper/imprinter during use, hence eliminating, or at least substantially reducing, flexural deformation of the main body of the stamper/imprinter upon application of pressure thereto for urging the imprinting surface into intimate contact with the surface of the magnetic recording layer or material. Further according to the invention, the partial spiral-shaped channels formed between adjacent reinforcing ribs advantageously also serve to vent air or other gas which may be present or otherwise entrapped in the space between the imprinting surface of the stamper/imprinter and the surface of the magnetic recording layer or material, thereby eliminating, or at least substantially reducing, another factor leading to poor contact between the imprinting surface and the magnetic layer.

Similarly, a feature of the present invention in the case of stampers/imprinters wherein the unpatterned data zones extend for the same depth as the patterned servo sectors and thus are intended to contact the surface of the magnetic material or layer during patterning, as for example shown in FIGS. 8 (A)–8 (B) and 9, is the provision of a plurality of spaced-apart, radially extending channels in the data zones, which partial spiral-shaped channels advantageously serve to vent air or other gas which may be present or otherwise entrapped in the space between the imprinting surface of the stamper/imprinter and the surface of the magnetic recording layer or material, thereby eliminating, or at least substantially reducing, a major factor leading to poor contact between the imprinting surface and the magnetic layer when the former contacts the latter during contact printing.

In either instance, according to the inventive methodology, any magnetic transition patterns formed in the data zones during the contact printing process due to the presence of the reinforcing ribs or gas venting channels are erased in conventional manner subsequent to contact printing.

Figures 10A, 10B:
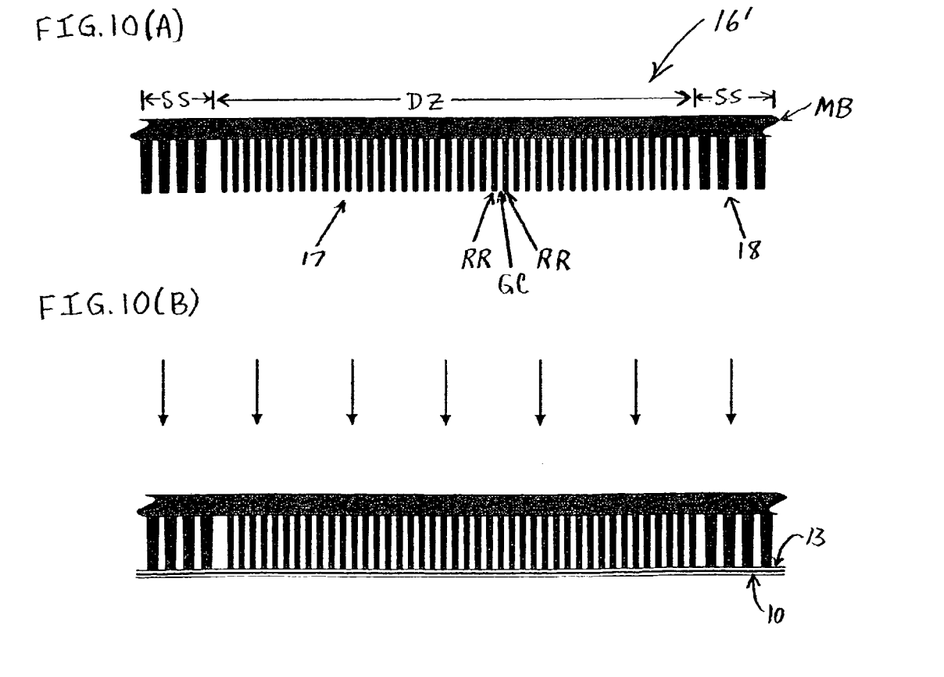
Figure 11:
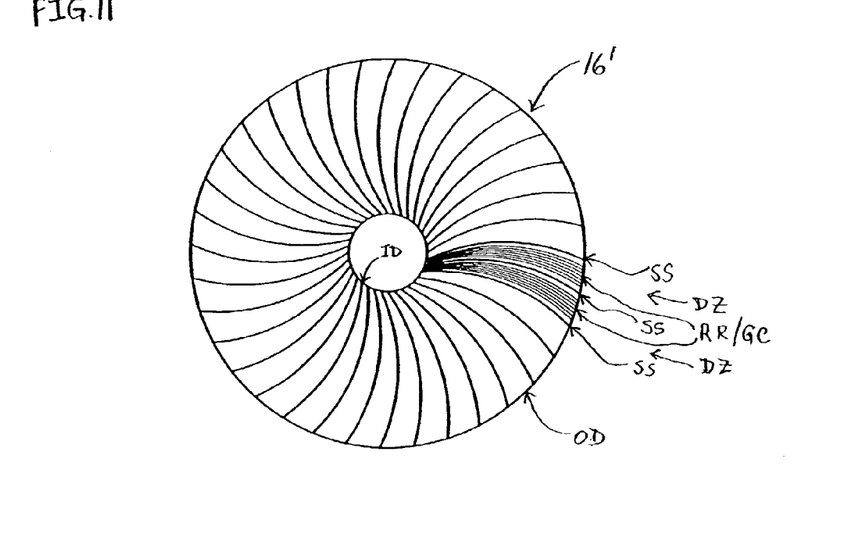
FIG. 11 is a plan view of the imprinting surface of an annular disk-shaped stamper/imprinter corresponding to the embodiment of the invention shown in cross-sectional view in FIGS. 10 (A) and 10 (B)

Referring now to FIGS. 10 (A)–10 (B) shown therein, in schematic, simplified cross-sectional view, is a portion of an embodiment of a stamper/imprinter 16' of the first type (shown in FIGS. 6–7) modified according to the invention, comprised of projection-patterned servo sectors SS and recessed, unpatterned data zones DZ which are modified to include a plurality of mechanical reinforcement ribs RR spaced apart by gas venting channels GC, prior to and during use, respectively; and FIG. 11 is a plan view of the imprinting surface of an annular disk-shaped stamper/imprinter 16' corresponding to the embodiment of the invention shown in FIGS. 10 (A) and 10 (B).

With particular reference to FIG. 10 (B) illustrating stamper/imprinter 16' in use, i.e., in contact with the surface of a magnetic recording layer 13 on substrate 10, it is evident that the large plurality of mechanical reinforcement ribs RR in the data zone DZ which project for the same distance as the pattern features (projections 18) of the servo sectors SS, and thus also contact the magnetic recording layer 13 during use, effectively prevent, or at least minimize flexural distortion of the main body MB of the stamper during use, as for example shown in FIG. 6 (B), leading to poor pattern replication fidelity. By way of illustration only, a stamper/imprinter 16' according to the invention, having 25 and 100 mm inner and outer diameters, respectively, utilized for contact printing servo patterns in 95 mm diameter workpieces for hard disks, typically comprises data zones DZ having a width of about 0.4 mm at the inner diameter ID and a width of about 1.5 mm at the outer diameter, provided with reinforcement ribs RR from about 0.0001 to about 0.01 mm wide at the inner diameter and from about 0.0004 to about 0.04 mm wide at the outer diameter, spaced apart by gas venting channels GC from about 0.0001 to about 0.01 mm wide at the inner diameter ID and from about 0.0004 to about 0.04 mm wide at the outer diameter OD, which mechanical reinforcement ribs RR project from the main body MB of the stamper/imprinter 16' for a distance substantially equal to that of the pattern features 18 of the servo sector SS, e.g., from about 20 to about 500 nm.

Adverting to FIG. 11, showing a plan view of the embodiment of the stamper/imprinter 16' shown in cross-sectional view in FIGS. 10 (A)–10 (11), according to the invention, each of the spaced-apart mechanical reinforcement ribs RR extends radially in a partial spiral-shaped manner from the inner diameter ID to the outer diameter OD, thereby forming a plurality of correspondingly partial-spiral shaped gas venting channels GC extending from the inner diameter to the outer diameter in the spaces between adjacent reinforcement ribs. Typical radii of curvature of each of the partial spiral-shaped reinforcement ribs RR and gas venting channels GC of the illustrative embodiment, wherein the annular disk has 25 and 95 mm inner and outer diameters, respectively, are from about 20 to about 100 nm.

Figure 12:
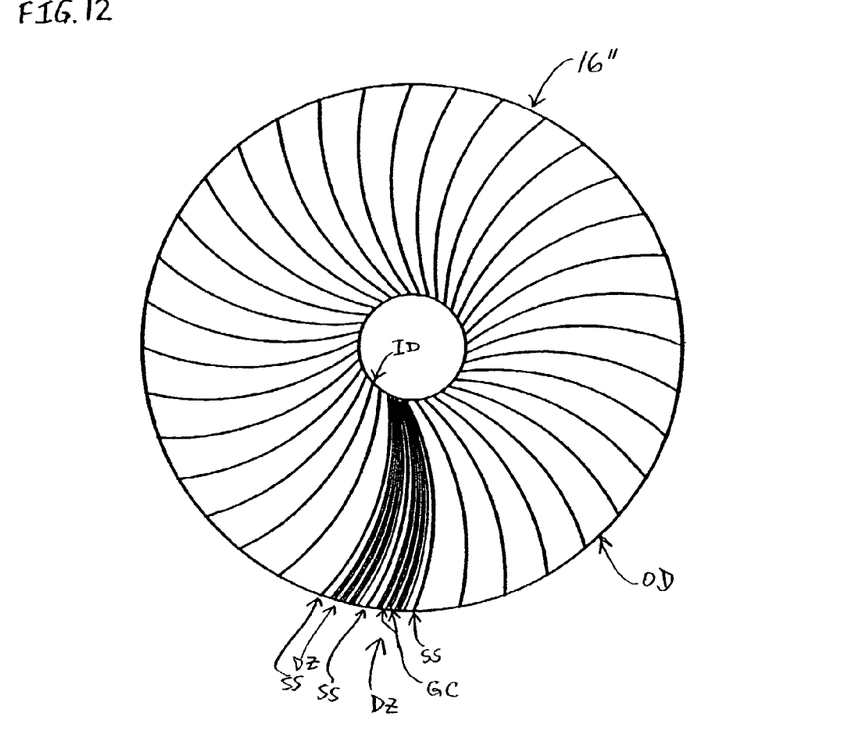
FIG. 12 is a plan view of the imprinting surface of an annular disk-shaped stamper/imprinter of the type shown in cross-sectional view in FIGS. 8 (A) and 8 (B), and in plan view in FIG. 9, modified according to the invention.

Referring now to FIG. 12, shown therein is a plan view of the imprinting surface of an annular disk-shaped stamper/imprinter 16″ of the type shown in cross-sectional view in FIGS. 8 (A) and 8 (B), and in plan view in FIG. 9, modified according to the invention. Specifically, according to this embodiment, a plurality of spaced-apart, radially extending, partial spiral-shaped gas venting channels GC, similar to those of the preceding embodiment, are provided in the projecting data zones DZ of the imprinting surface. As in the preceding embodiment, the partial spiral-shaped channels advantageously serve to vent air or other gas which may be present or otherwise entrapped in the space between the imprinting surface of the stamper/imprinter and the surface of the magnetic recording layer or material, thereby eliminating, or at least substantially reducing, a major factor leading to poor contact between the imprinting surface and the magnetic layer when the former contacts the latter during contact printing.

By way of illustration only, a stamper/imprinter 16″ according to the invention, having 25 and 100 mm inner and outer diameters, respectively, utilized for contact printing servo patterns in 95 mm diameter workpieces for hard disks, typically comprises projecting data zones DZ having a width of about 0.4 mm at the inner diameter ID and a width of about 1.5 mm at the outer diameter, provided with gas venting channels GC from about 0.0001 to about 0.01 mm wide at the inner diameter and from about 0.0004 to about 0.04 mm wide at the outer diameter. According to the invention, each of the spaced-apart gas venting channels GC extends radially in a partial spiral-shaped manner from the inner diameter ID to the outer diameter OD. Typical radii of curvature of the partial spiral-shaped gas venting channels GC of the illustrative embodiment, wherein the annular disk has 25 and 95 mm inner and outer diameters, respectively, are from about 20 to about 100 nm.

It should be apparent to one of ordinary skill in the art that the present invention provides a significant improvement over the art such as has been described above, particularly with respect to the improved pattern replication fidelity afforded by the invention. Further, the imprinting surface of the stampers/imprinters according to the invention can be formed with a wide variety of magnetic transition patterns, whereby the inventive methodology and apparatus can be rapidly, easily, and cost-effectively implemented in the automated manufacture of a number of articles, devices, etc., requiring magnetic transition patterning, of which servo patterning of longitudinal and perpendicular magnetic recording media merely constitute examples of the versatility and utility of the invention.

In the previous description, numerous specific details are set forth, such as specific materials, structures, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in other combinations and environments and is susceptible of changes and/or modifications within the scope of the inventive concept as expressed herein.

What is claimed is:

1. An apparatus for performing contact printing of a magnetic transition pattern in a magnetic recording medium, comprising:
    (a) a stamper/imprinter including a body formed of at least one magnetic material having a high saturation magnetization $B_{sat} \geq$ about 0.5 Tesla and a high permeability $\mu \geq$ about 5, said body including an imprinting surface adapted to be placed in intimate contact with a surface of a magnetic layer, said imprinting surface comprised of a plurality of patterned areas, each of said plurality of patterned areas includes a plurality of projections forming an image of a servo sector and which separate a plurality of areas which are not patterned, each of said plurality of areas which is not patterned corresponds to a data zone and provided with at least one of:
        (i) mechanical reinforcing means for preventing deformation of said body when said imprinting surface is urged into contact with said surface of said magnetic layer; and
        (ii) gas venting means for facilitating removal of air or other gas from between said imprinting surface and said surface of said magnetic layer when said imprinting surface is urged into contact with said surface of said magnetic layer,
    wherein each of said plurality of areas corresponding to said data zones which are not patterned is in the form of a projection extending to the same height as said projections forming said image of said servo sector.

2. The apparatus as in claim 1, wherein:
    each of said plurality of patterned areas is formed in said magnetic layer and each of said areas which is not patterned is formed in said magnetic layer.

3. The apparatus as in claim 2, wherein:
    said plurality of patterned areas forming said servo sectors occupy from about 2 to about 20% of said imprinting surface and said plurality of areas corresponding to said data zones which are not patterned occupy from about 80 to about 98% of said imprinting surface.

4. The apparatus as in claim 1, wherein:
    each of said plurality of projections has a height in the range from about 20 to about 500 nm, a width in the range from about 0.01 to about 1 μm, and a spacing between adjacent projections of at least about 0.01 μm.

5. The apparatus as in claim 1, wherein:
    each of said plurality of areas corresponding to said data zones which are not patterned is recessed relative to said projections forming said image of said servo sectors.

6. The apparatus as in claim 5, wherein:
    each of said recessed areas corresponding to said data zones comprises mechanical reinforcing means (i) in the form of a plurality of spaced-apart projections.

7. The apparatus as in claim 6, wherein:
adjacent ones of said plurality of spaced-apart projections comprising said mechanical reinforcing means (i) form channels in said data zones comprising said gas venting means (ii).

8. The apparatus as in claim 7, wherein:
said imprinting surface is annular disk-shaped with inner and outer diameters, each of said plurality of patterned areas forming said servo sectors comprises a plurality of parallel spaced-apart projections extending radially in partial spirals originating at said inner diameter and extending to said outer diameter, and said plurality of spaced-apart projections comprising said mechanical reinforcing means (i) in said data zones form said gas venting means (ii) as parallel spaced-apart channels extending radially in partial spirals originating at said inner diameter and extending to said outer diameter.

9. The apparatus as in claim 1, wherein:
said imprinting surface is annular disk-shaped with inner and outer diameters, each of said plurality of patterned areas forming said servo sectors comprises a plurality of parallel spaced-apart projections extending radially in partial spirals originating at said inner diameter and extending to said outer diameter, and each of said data zones comprises a plurality of gas venting means (ii) in the form of parallel spaced-apart channels extending radially in partial spirals originating at said inner diameter and extending to said outer diameter.

10. The apparatus as in claim 1, wherein:
said body formed of at least one magnetic material having a high saturation magnetization $B_{sat} \geq$ about 0.5 Tesla and a high permeability $\mu \geq$ about 5 comprises at least one material selected from the group consisting of Ni, NiFe, CoNiFe, CoSiFe, CoFe, and CoFeV.

11. The apparatus as in claim 1, further comprising:
(b) magnet means for applying a unidirectional magnetic field to said stamper/imprinter for effecting selective re-alignment of magnetic domains of a magnetic material in contact with said imprinting surface of said stamper/imprinter.

12. An apparatus for performing contact printing of a magnetic transition pattern in a magnetic recording medium, comprising:
(a) a stamper/imprinter including a body formed of at least one magnetic material, said body including an imprinting surface adapted to be placed in intimate contact with a surface of a magnetic layer, said imprinting surface comprised of a plurality of patterned areas, each of said plurality of patterned areas includes a plurality of projections forming an image of a servo sector and which separate a plurality of areas which are not patterned, each of said plurality of areas which is not patterned corresponds to a data zone and provided with at least one of:
  (i) mechanical reinforcing means for preventing deformation of said body when said imprinting surface is urged into contact with said surface of said magnetic layer; and
  (ii) gas venting means for facilitating removal of air or other gas from between said imprinting surface and said surface of said magnetic layer when said imprinting surface is urged into contact with said surface of said magnetic layer,
wherein each of said plurality of areas corresponding to said data zones which are not patterned is in the form of a projection extending to the same height as said projections forming said image of said servo sector.

* * * * *